United States Patent [19]

Murtha et al.

[11] B 4,001,182
[45] Jan. 4, 1977

[54] FLAME RETARDANTS FOR POLYMERS

[75] Inventors: Timothy P. Murtha; Roy A. Gray, both of Bartlesville, Okla.

[73] Assignee: Phillips Petroleum Company, Bartlesville, Okla.

[22] Filed: Mar. 20, 1972

[21] Appl. No.: 236,342

[44] Published under the second Trial Voluntary Protest Program on February 10, 1976 as document No. B 236,342.

[52] U.S. Cl. .................. 260/45.85 R; 260/45.75 B; 260/45.75 W; 260/45.95 L; 260/45.7 R; 260/408; 260/476 R; 260/488 J; 260/615 R

[51] Int. Cl.² .......................................... C08J 3/20

[58] Field of Search ........ 260/45.85 R, 478, 488 J, 260/476 R, 408, 45.7 R, 45.95 L, 45.75 B, 615, 611.5; 252/8.1

[56] References Cited

UNITED STATES PATENTS

| | | | |
|---|---|---|---|
| 3,252,922 | 5/1966 | Degener | 260/858 |
| 3,700,625 | 10/1972 | Brady | 260/45.75 R |
| 3,864,306 | 2/1975 | Dieckmann | 260/45.75 |

FOREIGN PATENTS OR APPLICATIONS 915,193 11/1972 Canada

*Primary Examiner*—V.P. Hoke

[57] ABSTRACT

Novel compounds having the formula

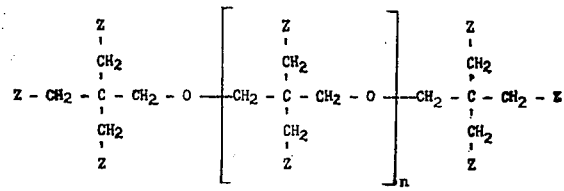

wherein $n$ is an integer, 0 to 3 and Z is selected from bromine or

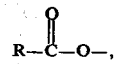

the proportion of the selected Br— and $RCO_2$—being such that the weight percent Br in the compound will be in range 20 to 70, the R in the carboxylate group containing from 1 to 17 carbons and being selected from alkyl, cycloalkyl, aryl, and combinations thereof such as alkaryl and aralkyl, the R groups being the same or different.

The now preferred compound 1,7-diacetoxy-2,2,6,6-tetra(bromomethyl)-4-oxaheptane (DATBOH) is prepared by reaction of dipentaerythritol, acetic anhydride and anhydrous hydrogen bromide at about 100° C., extracting with a solvent, treating with an alkaline wash, and recovering the product as a viscous liquid. Alternately, the corresponding hexaacetate can be brominated using hydrogen bromide.

The product compounds are useful as flame retardants, for example, for polymers, e.g. polyolefins, more particularly polypropylene.

Antimony trioxide and other inorganic oxides and other compounds known in the art as improving the effect of a bromine-containing compound can be incorporated into the composition of the invention, to increase the flame retardant effect of the compound of the invention.

5 Claims, No Drawings

FLAME RETARDANTS FOR POLYMERS

This invention relates to a novel compound. It also relates to a novel composition of matter containing said compound. Further, the invention relates to a flame-retardant containing composition. More particularly, the invention relates to a plastic or polyolefin containing a flame retardant, bromine containing compound.

In one of its concepts the invention provides a compound having the formula

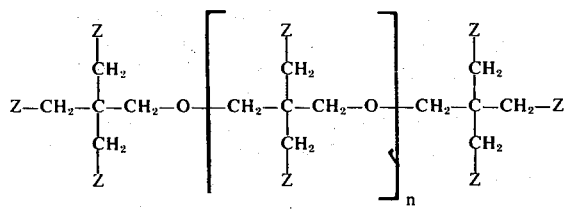

wherein $n$ is an integer, 0 to 3, and Z is selected from bromine or

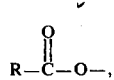

the proportion of the selected Br— and $RCO_2$— being such that the weight percent Br in the compound will be in the range 20 to 70, the R in the carboxylate group containing from 1 to 17 carbons and being selected from alkyl, cycloalkyl, aryl, and combinations thereof such as alkaryl and aralkyl, the R groups being the same or different.

In another of its concepts the invention provides a flame-retarded composition comprising a flame-retarding compound of the invention and a plastic or polyolefin, e.g. a polymer of a mono-alpha-olefin having the general formula $CH_2\!\!=\!\!CHR$ wherein R represents hydrogen, an aryl radical, an alkyl radical and combinations thereof such as alkaryl and aralkyl having up to a total of 10 carbon atoms in each R group. Typical polymers are the homopolymers and copolymers of ethylene, propylene, butene-1, isobutylene, pentene-1, 4-methylpentene-1, styrene, and dimethylstyrene.

The flame retardants of the invention also find utility in polymers derived from acrylonitrile, acrylic acid esters, and other polymers including polyamides, polyurethanes, polyureas, and indeed, in any other polymeric substrate where organohalides, e.g. organobromides possess flame retardant capabilities. The now preferred polymers for application of DATBOH and related compounds are those derived from the vinyl hydrocarbons.

In a further concept of the invention there is provided a method for producing the now preferred compound of the invention by treating dipentaerythritol in a mixture of acetic anhydride and acetic acid with anhydrous hydrogen bromide at a temperature in the range of from about 10°–225°C., preferably 80°–160°C., more preferably about 90°–110°C. for about 5–10 hrs.

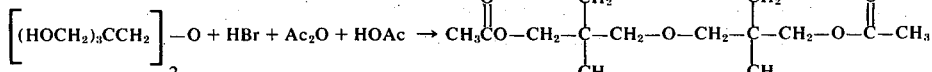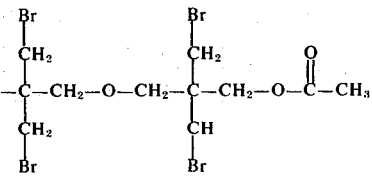

In a still further concept of the invention, it provides a process for flame-retarding a polyolefin by compositing the same with a minor amount, say, 1–15 parts per hundred of polymer of a compound of the invention, e.g. polypropylene containing a minor amount of 1,7-diacetoxy-2,2,6,6-tetra(bromomethyl)-4-oxaheptane (DATBOH).

It is known that bromine-containing compounds are generally effective flame-retardant additives for polyolefins, particularly for polypropylene. However, most compounds of this type have limitations due to their thermal instability which restricts the maximum processing temperature which can be employed. In addition, it has been found that many such bromine compounds, while providing a flame-retardancy effect, are unsuitable because of their tendency to cause degradation of the polymer. This adverse effect can be readily observed by the increase in the melt flow number of the polymer composition. Thus, an additive system capable of providing a flame-retardancy effect, without causing thermal degradation of the polymer at processing conditions, would be a significant contribution to the art.

In a still further concept the invention provides the improved compositions in which there is incorporated into the polymer or polyolefin or other plastic material, as herein set out, an inorganic oxide, e.g. antimony trioxide or other inorganic oxide or another compound together with the now preferred flame-retardant compound of the invention and/or a related compound. The use of such materials together with flame-retardants, generally, is known in the art. The inherent stability of the compounds of the invention promotes their utility in applications in which relatively high temperatures are used, e.g. fabrication at temperatures in the range of from about 300°F. to about 500°F. In such fabrication the known additives are used.

We have now discovered that certain bromine compounds, as herein set forth, will act as flame-retardants having a high thermal stability and, therefore, permitting use of higher desirable processing temperatures in the working of a polymer, for example, a polyolefin, e.g. polypropylene. The melt flow is not substantially increased and other desirable properties of the polymer are also not affected adversely. Thus, no significant degradation of the polymer during processing is observed.

It is an object of this invention to provide a novel bromine containing compound. Another object of the invention is to provide a method for preparing such a compound. A further object of this invention is to provide a novel flame-retardant additive system for a polyolefin. It is a further object of this invention to provide a novel flame-retarded polyolefin composition. A still further object is to provide a flame-retarded polypropylene composition.

Other aspects, concepts, objects and the several advantages of the invention are apparent from this disclosure and the appended claims.

According to the present invention there is provided a method for the preparation of a bromine containing compound by reacting usually at a temperature in the approximate range 10°–225°C. a compound having the formula

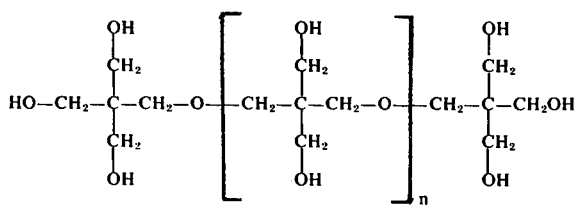

wherein *n* is an integer, 0–3, with acetic anhydride and HBr.

Further according to the invention, as an alternate, compounds can be prepared by substituting bromine for some of the

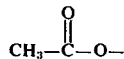

groups in a compound of the formula

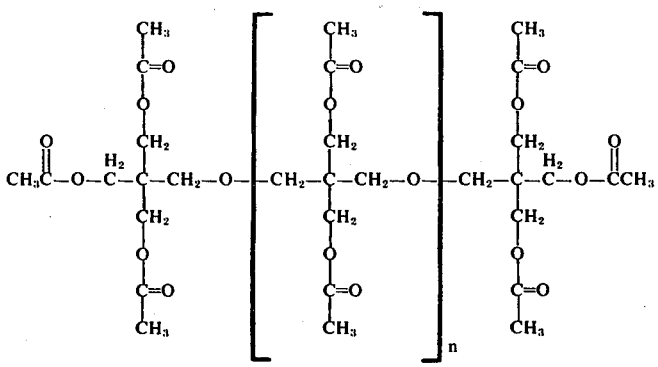

wherein *n* is an integer, 0–3, by reacting said compound with hydrogen bromide in the presence of an organic solvent, e.g. acetic acid, within a temperature range of from about 0° to about 250°C., preferably within the temperature range of 90° to 180°C.

Also according to the invention, there are provided novel compounds which are DATBOH and related compounds which can be classed as members of a series generically specified as in the above generic formula for said compounds. In said generic formula, when *n* equals zero, the compounds can be referred to as derivatives of dipentaerythritol. Similarly, for *n* equals one, two and three, the compounds can be referred to as derivatives of tri-, tetra-, and penta-pentaerythritol, respectively.

Further still according to the invention, a compound of the invention is composited or incorporated with a plastic as herein set forth to impart thereto flame-retardant properties without however adversely affecting the desired processing and other properties of the plastic. Other ingredients or additives can be composited, according to the invention, e.g. antimony trioxide or other inorganic oxide, compound or additive or filler, etc. as later described.

Thus, according to the invention, there are provided the flame-retarded compositions.

EXAMPLE I

Synthesis of 1,7-diacetoxy-2,2,6,6-tetra(bromomethyl)-4-oxaheptane

The following basic procedure was employed in the syntheses. Operational differences from run to run were as indicated in Table I.

Dipentaerythritol, acetic anhydride, anhydrous hydrogen bromide, acetic acid solvent if employed, and a catalyst if employed are combined under sufficient cooling to maintain the reaction mixture at room temperature. The reaction mixture is then stirred and heated during the reaction period as indicated in Table I after which DATBOH is isolated by conventional procedures. A specific illustration of this procedure is shown below.

A 3-ounce glass pressure reactor was charged with dipentaerythritol (13.1 g. of 97% dipentaerythritol: 12.7 g. 0.05 mole), acetic anhydride (26.2 g., 24.2 ml., 0.256 mole) and acetic acid (30 ml.). Anhydrous hydrogen bromide was pressured into the sealed reactor. Initially, the temperature rose to approximately 100°C. but was cooled to and maintained at room temperature during continued addition of hydrogen bromide until a total of 28.9 g. (0.357 mole) hydrogen bromide had been added. Then, sufficient heat was supplied to maintain the reaction mixture in the range of 96°–105°C. for a period of 6 hours during which the pressure rose to a maximum of 71 psig. The reactor was then vented and the hot product mixture was poured into 300 ml. ice water. The resulting mixture was extracted with chloroform; the chloroform extracts were washed in turn with water, 5% aqueous sodium bicarbonate, and again with water; then dried over anhydrous magnesium sulfate; filtered; and concentrated under reduced pressure to recover a clear viscous liquid. This product (28.6 g., 97.4% of theory) was identified by elemental analysis, infrared and NMR spectroscopy to be 1,7-diacetoxy-2,2,6,6-tetra(bromomethyl)-4-oxaheptane.

(32.6 g., 0.32 mole) and 20 ml. of acetic acid. Anhydrous hydrogen bromide (32.4 g., 0.4 mole) was pressured into the reactor, while the solution of the above

TABLE I

| Run | DPE[1] moles | HBr moles | HBr moles per mole DPE | Ac$_2$O[2] moles | Ac$_2$O moles per mole DPE | Catalyst Compound | Catalyst moles | HOAc[3] ml. | Hrs. | °C | Mole Percent Yield of DATBOH[4] |
|-----|------|-------|-------|-------|------|-----------|--------|-----|-----|-----|------|
| 1 | 0.05 | 0.40 | 8.0 | 0.33 | 6.6 | KI | 0.01 | 15 | 5.5 | 96 | 100 |
| 2 | 0.05 | 0.48 | 9.6 | 0.36 | 7.2 | none | — | 0 | 5 | 110 | 100 |
| 3 | 0.05 | 0.408 | 8.0 | 0.362 | 7.1 | CoBr$_2$·6 H$_2$O | 0.0031 | 0 | 6 | 110 | 98.6 |
| 4 | 0.05 | 0.37 | 7.4 | 0.33 | 6.2 | none | — | 0 | 5 | 95 | 98 |
| 5 | 0.05 | 0.357 | 7.1 | 0.256 | 5.1 | none | — | 30 | 6 | 97 | 97 |
| 6 | 0.025 | 0.408 | 16.2 | 0.159 | 6.3 | none | — | 25 | 5.5 | 96 | 97 |
| 7 | 0.05 | 0.405 | 8.1 | 0.256 | 5.1 | AlCl$_3$ | 0.20 | 25 | 5.5 | 92 | 95 |
| 8 | 0.05 | 0.40 | 8.0 | 0.33 | 6.6 | none | — | 15 | 2.5 | 93 | 95 |
| 9 | 0.01[5] | 0.135 | 13.5 | 0 | 0 | none | — | 50 | 7 | 150 | 93 |
| 10 | 0.05 | 0.408 | 8.1 | 0.256 | 5.1 | ZnCl$_2$ | 0.05 | 25 | 5 | 92 | 90 |
| 11 | 0.025 | 0.217 | 8.7 | 0.175 | 7.0 | none | — | 0 | 7 | 140 | 88.2 |
| 12 | 0.05 | 0.22 | 4.4 | 0.256 | 5.1 | none | — | 30 | 6 | 92 | & 81[6] |

[1]Dipentaerythritol
[2]Acetic anhydride
[3]Acetic acid
[4]1,7-Diacetoxy-2,2,6,6-tetra(bromomethyl)-4-oxaheptane
[5]Starting material is not dipentaerythritol, it is dipentaerythritol hexaacetate (1,2,2,6,6,7-hexaacetoxy-4-oxaheptane)
[6]An approximate 81 mole percent yield of mixed products, DATBOH and the corresponding triacetoxy-tribromo compound, were obtained.

The runs tabulated above demonstrate that, within the ranges we have disclosed, yields of DATBOH from 81% to quantitative can be obtained.

EXAMPLE II

A 3-ounce glass pressure reactor was charged with 1,2,2,6,6,7-hexaacetoxy-4-oxaheptane (5.1 g., 0.01 mole) and 50 ml. of acetic acid. The solution was stirred and cooled to 0°–10°C., and anhydrous hydrogen bromide (11 g., 0.135 mole) was bubbled in slowly, maintaining the temperature at 0°–10°C. The reactor was closed and allowed to warm to room temperature with continued stirring for 15 hrs., then the mixture was heated with continued stirring, to maintain 148°–156°C. for a period of 7 hrs. during which the pressure rose to maximum of 202 psig. The reaction mixture was allowed to cool to room temperature overnight. The reactor was then vented and the product mixture was poured into water. The resulting mixture was extracted with chloroform, the chloroform extracts were washed in turn with water, 5% aqueous sodium bicarbonate and then again with water, then dried over anhydrous magnesium sulfate, filtered, and concentrated under reduced pressure to recover a yellow liquid. This product (5.93 g., yield was effectively quantitative) was identified by infrared and nuclear magnetic resonance spectroscopy as 1,7diacetoxy-2,2,6,6-tetra(-bromomethyl)-4-oxaheptane.

The procedure of Example II can be applied to the preparation of a compound in which the R of the

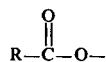

of the generic formula has up to and including 6 carbons. This includes the caprooxy derivative.

Example III is a run using the tripentaerythritol compound of the generic formula given herein in which $n$ equals one.

EXAMPLE III

A 3-ounce glass reactor was charged with tripentaerythritol (14.9 g., 0.04 mole), acetic anhydride reactants was stirred and maintained at 25°C. after an initial temperature rise to 80°–100°C. The resulting mixture was maintained, with continued stirring, at 120°C. for 6 hours during which time the maximum pressure was 115 psig. The mixture was allowed to cool to room temperature overnight. The reactor was vented and the reaction mixture was poured into water and extracted with chloroform. The chloroform extracts were washed in turn with water, 5% aqueous sodium bicarbonate, again with water and then dried over anhydrous magnesium sulfate, filtered and concentrated under reduced pressure to recover a viscous liquid. This product (30.1 g., 92.5% of theory) was identified by infrared and nuclear magnetic resonance spectroscopy to be 1,11-diacetoxy-6-acetoxymethyl-2,2,6,10,10-penta(bromomethyl)-4,8-dioxaundecane.

Examples of compounds of the invention having the above given generic formula, in addition to DATBOH, are: 1-acetoxy-2,2,6,6-tetra(bromomethyl)7-bromo-4-oxaheptane; 1,7-dicarpryloxy-2,2,6,6-tetra(bromomethyl)-4-oxaheptane; 1-stearyloxy-2,2,6,6-tetra(-bromomethyl)-7-bromo-4-oxaheptane; 1,11-diacetoxy-6-acetoxymethyl-2,2,6,10,10-penta(-bromomethyl)-4,8-dioxaundecane; 1-cyclohexanecarboxy-15-benzoxy-2,2,6,6,10,10,14,14-octa(bromomethyl)-4,8,12-trioxapentadecane; 1-(4-methylbenzoxy)-19-phenylacetoxy-2,2,6,6,10,10,14,14,18,18-deca(-bromomethyl)-4,8,12,16-tetraoxanonadecane. The above compounds are prepared by applying the now preferred, first described, process of the present invention to corresponding hydroxy compounds.

Flammability Determinations

DATBOH and antimony trioxide were incorporated into white, commercial polypropylene of melt flow of about 4.0 g./10 min. (ASTM D 1238-62T, Condition L) by dry blending on a 2-roll mill at a temperature of 320°–360°F. The resulting blends were then compression molded at 325°–375°F. into sheets ⅛-inch thick from which samples were cut. The burning characteristics of the samples were determined by the limiting oxygen index method (C. P. Fenimore and F. J. Martin, Modern Plastics, 43, 141, November, 1966). The limiting oxygen index, LOI, was 0.242 and is defined as the minimum volume fraction of oxygen required in an oxygen/nitrogen atmosphere to sustain burning of a plastic test sample.

Thermal Stability Determinations

DATBOH and antimony trioxide were incorporated into white, commercial polypropylene of melt flow of about 4.0 g./10 min. (ASTM D 1238-62T, Condition L) by dry blending on a 2-roll mill at a temperature of 320°–360°F. A 5 g. portion of the dry blend was charged to a standard melt indexer and held at a given temperature for a given number of minutes. At the end of this period (e.g. 5 minutes), the amount of polymer extruded during one minute under 328 g. total load was determined. Enough additional polymer was then quickly extruded to independently make a one-inch disc for color comparison. This procedure was repeated at the end of 10 minutes. Table II shows the thermal stability of polypropylene formulations containing an inventive flame retardant according to the invention, i.e. DATBOH. The numbers in the table represent the weight in grams of the formulations which are extruded in one minute after heating individual samples of the specified formulation to 490°F, 510°F, 525°F, and 550°F, respectively. The higher numbers indicate some tendency toward polymer degradation with increasing temperature. Obviously, 550°F is an extreme test temperature.

TABLE II*

|  | 490 F | | 510 F | | 525 F | | 550 F | |
| --- | --- | --- | --- | --- | --- | --- | --- | --- |
|  | 5 Min | 10 Min | 5 Min | 10 Min | 5 Min | 10 Min | 5 Min | 10 Min |
| DATBOH | white .05 | white .07 | white .09 | off-white .34 | white .24 | lt. gray 1.8 | lt. gray 4 | gray a large value, difficult to measure |

*All formulations contained polypropylene, 2 phr brominated flame retardant, and 1 phr antimony oxide. Values given are grams/minute.

Generally, the conditions for synthesizing the compounds of the invention are:

|  | Broad range | Preferred range |
| --- | --- | --- |
| Temperature, °C | 10 – 225 | 80 – 160 |
| Reaction time | a few minutes - 48 hrs. | 1 hr. - 12 hrs. |
| Pressure, psig | 0 - no definite upper limit consistent with formation of the proper product type | autogeneous (approximately 50 to approximately 200) |
| Mole ratios |  |  |
| HBr/Dipentaerythritol | 0.1 – 100 | 3 – 20 |
| Acetic anhydride/ Dipentaerythritol | 0.1 – 100 | 3 – 20 |

The conditions given are now preferred for the production of DATBOH. However, these conditions can be applied generally to other compounds of the invention, as the molecular weight of the reacting compound increases the number of functional groups will increase. Accordingly, the ratio of the reacting centers to the molecule backbone will decline somewhat. Therefore, the reaction conditions advantageously will be modified as can be determined by mere routine testing.

Solvents can include carboxylic acids preferably containing same R radical contained in the anhydride (i.e., acetic acid being used in conjunction with acetic anhydride).

Inert diluents can be employed if desired, e.g., n-heptane, isooctane, benzene, toluene, the xylenes, carbon tetrachloride, carbon tetrabromide, chloroform, hexachloroethane, corresponding bromine compounds and the like. Acetic acid when used with or without other diluents acts to solubilize the HBr and to moderate the initial temperature rise. Whether or not acetic acid is employed in solvent quantities, it will be generated by the esterification of the hydroxyl compound by acetic anhydride.

It has now been discovered that utilization of an additive system comprising the combination of DATBOH and/or a related compound with antimony trioxide, particularly for polypropylene, results in a polymeric composition which is flame-retarded. The additive system of this invention is prepared by mixing at least one compound from the group consisting of DATBOH and related compounds (A) with antimony trioxide (B) in amounts such that the weight ratio of A:B is in the range of 1:1 to 5:1. In utilizing this additive system, there is no definite upper limit for the amount of total additives to be employed, so long as the properties of the polymeric composition required for a particular use are retained. Ordinarily, the additives are used at the lowest level which will provide the desired degree of retardancy. The following ranges are generally employed:

|  | Broad* | Preferred* |
| --- | --- | --- |
| DATBOH and/or related compound | 1 – 15 | 2 – 5 |
| Antimony trioxide | 1 – 15 | 1 – 2.5 |

*parts per hundred parts of polymer

The upper limit of total additive incorporated into any normally solid olefin polymer will vary with each polymer. However, for one presently preferred embodiment of this invention, the preferred ranges listed above are those which have been found to be most applicable to polypropylene.

As alternatives to antimony trioxide, other inorganic oxides and/or other compounds, e.g. zinc borate, bicumyl, various arsenic and phosphorous compound, will promote the flame retardant effect of DATBOH and its related compounds, can be employed in polymer formulation.

The production of the flame-retarded compositions can be carried out in various manners, readily apparent to those skilled in the art. For example, intimate mixtures of the polymer and flame retarding additive according to this invention can be achieved by mixing various additives with the polymer at an elevated temperature in an extrusion press or kneader. Since the incorporation of flame retardants in general with polymers is a technique well known in the art, the mode of mixing the ingredients constituting the novel compositions of this invention is not considered a part of this disclosure.

The flame-retarded compositions of this invention are useful for a variety of purposes such as in the application of electrical insulating compositions for house wiring, small appliances, electronic equipment wire insulation, jacketing and the like. In addition, the compositions formed of polypropylene are further particularly useful in fiber production wherein a significant alteration of the melt flow characteristics of the polymer and/or the color thereof are sought to be avoided.

It is to be understood that the composition of this invention can contain, in addition to the flame-retardant system, other additives such as certain fillers, dyes, pigments, plasticizers, antioxidants, thermal stabilizers, antistatic agents and the like. Such compounds are well known in the art and, for the sake of brevity, will not be repeated here.

The compounds of the present invention do not contain as much of the relatively rare bromine as might have been added to their basic structure. Indeed, by the esterification step which is practiced together or simultaneously with the addition of bromine the resulting compound does not require as much bromine as it would without said step. Yet the compounds of the invention possess satisfactory flame-retardant imparting properties.

Reasonable variation and modification are possible within the scope of the foregoing disclosure and appended claims, the essence of which is that there have been provided novel flame-retardant compounds prepared by reacting a hydroxyl compound having a structure according to the formula given herein with acetic anhydride and HBr, as described, or substitution of bromine for, say, acetoxy groups, also as described, and that compositions of a plastic and at least one of said compounds have been found to possess flame-retardant properties, without adversely affecting the desirable properties of the plastic, and further that the compositions can contain various flame-retardant additive promoters and/or fillers without adverse effect.

We claim:

1. A flame-retardant composition comprising 1,11-diacetoxy-6-acetoxymethyl-2,2,6,10,10-penta(bromomethyl)-4,8-dioxaundecane and a synthetic polymer plastic.

2. A composition according to claim 1 wherein the plastic is selected from a polyolefin, a polyamide, a polyurethane, and a polyurea.

3. A composition according to claim 2 wherein the polyolefin is a polymer of a mono-alpha-olefin having the general formula $CH_2 = CHR$ wherein R represents hydrogen, an aryl radical, an alkyl radical and combinations thereof such as alkaryl and aralkyl having up to a total of 10 carbon atoms in each R group.

4. A composition according to claim 3 wherein the polyolefin is polypropylene.

5. A composition according to claim 2 wherein the plastic is polypropylene and the 1,11-diacetoxy-6-acetoxymethyl-2,2,6,10,10-penta(bromomethyl)-4,8-dioxaundecane is incorporated with the plastic in an amount in the approximate range of from about 1 to about 15 parts per hundred of the plastic.

* * * * *